(12) United States Patent
Cardoso, Jr. et al.

(10) Patent No.: US 8,818,717 B2
(45) Date of Patent: Aug. 26, 2014

(54) METHOD FOR INCREASING WAYPOINT ACCURACIES FOR CROWD-SOURCED ROUTES

(71) Applicant: Pioneer Advanced Solutions, Inc., San Jose, CA (US)

(72) Inventors: Augusto C. Cardoso, Jr., Oakland, CA (US); Robert Curtis Cole, Los Altos, CA (US); Victor Chernetsky, Cupertino, CA (US); Jerry Dunmire, Santa Clara, CA (US); Charles Paul Morel, San Jose, CA (US); Dan Phan, San Jose, CA (US)

(73) Assignee: Pioneer Advanced Solutions, Inc., San Jose, CA (US)

( * ) Notice: Subject to any disclaimer, the term of this patent is extended or adjusted under 35 U.S.C. 154(b) by 0 days.

(21) Appl. No.: 13/852,049

(22) Filed: Mar. 28, 2013

(65) Prior Publication Data

US 2013/0261961 A1    Oct. 3, 2013

Related U.S. Application Data

(60) Provisional application No. 61/616,646, filed on Mar. 28, 2012.

(51) Int. Cl.
*G01C 21/00*       (2006.01)
(52) U.S. Cl.
USPC .......................................................... 701/426
(58) Field of Classification Search
None
See application file for complete search history.

(56) References Cited

U.S. PATENT DOCUMENTS

| | | | |
|---|---|---|---|
| 6,249,542 B1 | 6/2001 | Kohli et al. | |
| 7,840,340 B2 | 11/2010 | Graham et al. | |
| 8,000,897 B2 | 8/2011 | Breed et al. | |
| 8,086,402 B2 | 12/2011 | Kindo et al. | |
| 8,108,139 B1 | 1/2012 | Pylant | |
| 2003/0114206 A1 | 6/2003 | Timothy et al. | |
| 2004/0087317 A1* | 5/2004 | Caci | 455/456.1 |
| 2006/0217879 A1 | 9/2006 | Ikeuchi et al. | |
| 2010/0268449 A1 | 10/2010 | Feng | |
| 2011/0046878 A1 | 2/2011 | Sung et al. | |
| 2011/0143811 A1 | 6/2011 | Rodriguez | |
| 2011/0151898 A1 | 6/2011 | Chandra et al. | |
| 2011/0163914 A1 | 7/2011 | Seymour | |
| 2011/0283329 A1 | 11/2011 | Davis et al. | |
| 2011/0285583 A1 | 11/2011 | Huang et al. | |
| 2011/0285591 A1* | 11/2011 | Wong | 342/451 |
| 2012/0046860 A1 | 2/2012 | Curtis et al. | |

FOREIGN PATENT DOCUMENTS

JP        2005-326196        * 11/2005

OTHER PUBLICATIONS www.tomtombusiness-uk.custhelp, "TomTom Map Share", Nov. 17, 2011.
International Search Report and Written Opinion dated Jul. 1, 2013 of International Application No. PCT/ US2013/034253.

\* cited by examiner

*Primary Examiner* — John R Olszewski
*Assistant Examiner* — Navid Ziaeianmehdizadeh
(74) *Attorney, Agent, or Firm* — David D. Brush; Westman, Champlin & Koehler, P.A.

(57) ABSTRACT

A method for increasing route accuracies, comprising receiving GPS waypoints associated position accuracy prediction (PAP) parameters, comparing the PAP parameters to corpus PAP parameters associated with corpus GPS waypoints, and updating the corpus PAP parameters and the corpus GPS waypoints based on the comparison of the PAP parameters to the corpus PAP parameters.

17 Claims, 11 Drawing Sheets

METHOD FOR INCREASING WAYPOINT ACCURACIES FOR CROWD-SOURCED ROUTES

CROSS-REFERENCE TO RELATED APPLICATION(S)

This application claims priority to U.S. Provisional Patent Application No. 61/616,646, filed on Mar. 28, 2012, and entitled "METHOD FOR INCREASING WAYPOINT ACCURACIES FOR CROWD-SOURCED ROUTES".

FIELD

The present disclosure is directed to crowd-sourced data processing. In particular, the present disclosure is directed to methods for creating and updating crowd-sourced routes, such as for crowd-sourced maps.

BACKGROUND

Crowd sourcing, also referred to as crowdsourcing, is a concept in which an entity reaches out to the collective capabilities of the public at large to complete tasks that the entity would otherwise perform itself or outsource to another party. One appeal of crowd sourcing is free labor. However, more importantly, crowd sourcing enables entities to increase the useful talent pool for a particular task, and rely on people who have an interest in the given tasks. As such, crowd sourcing has expanded to many social and commercial areas, including authoring, scientific endeavors, social bookmarking, map generations, creating video collections, and the like. For example, one of the most popular authoring concepts for crowd sourcing is online encyclopedia entitled "WIKIPEDIA".

Crowd sourcing is typically performed by online communities, which submit information to solve the given tasks. The communities also attempt to find the best solutions, sometimes for recognition, monetary rewards, or other forms of compensation. However, crowd sourcing has raised criticism for numerous reasons. For example, crowd sourcing does not necessarily provide quality results, sometimes due to personal biases or lack of experience by the people in the crowd coursing communities.

Current crowd source map creation allows any person to upload information to add to a corpus of knowledge, such as adding a new trail or road to a corpus map. Furthermore, some people may have privileges that allow them to modify, update, correct, or delete information previously uploaded by themselves or others. However, generating and increasing accuracies for crowd-sourced maps can be time consuming, tedious, and may be dependent on the accuracies of the information provided (e.g., GPS waypoints). As such, there is a need for methods for increasing accuracies positional routes (e.g., roads, trails, paths, tracks, etc. . . . ) in crowd-sourced map databases that are easy to use and that provide quality estimates.

SUMMARY

An aspect of the present disclosure is directed to a method for increasing route accuracies. The method includes recording waypoints while moving along a route, recording positional-accuracy measurements for each recorded waypoint, and recording environment information for each recorded waypoint The method also includes calculating a position accuracy prediction (PAP) parameter for each recorded waypoint based on the recorded positional-accuracy measurements and the recorded environment information, and transferring the plurality of waypoints and the calculated PAP parameters to a computer-based system for comparison with a plurality of corpus waypoints and associated corpus PAP parameters.

Another aspect of the present disclosure is directed to a method for increasing route accuracies, which includes receiving a first GPS waypoint and a first PAP parameter associated with the first GPS waypoint, where the first PAP parameter comprises a first quality parameter set having a first weight value, a first confidence value for the first GPS waypoint, and a first error distance for the first GPS waypoint. The method also includes comparing the first PAP parameter to a corpus PAP parameter associated with a corpus GPS waypoint, where the corpus PAP parameter comprises a second quality parameter set having a second weight value, a second confidence value for the corpus GPS waypoint, and a second error distance for the corpus GPS waypoint. The method further includes updating the corpus PAP parameter and the corpus GPS waypoint based on the comparison of the first PAP parameter to the corpus PAP parameter.

Another aspect of the present disclosure is directed to a method for increasing route accuracies, which includes receiving a first GPS waypoint and a first PAP parameter, and reading corpus route data from a computer readable medium, the corpus route data comprising a corpus GPS waypoint and an associated corpus PAP parameter. The method also includes calculating a weight average based on weight values of the first PAP parameter and the corpus PAP parameter, calculating an updated GPS waypoint from the first GPS waypoint and the corpus GPS waypoint based at least in part on the calculated weight average, and replacing the corpus GPS waypoint with the updated GPS The method further includes adding the weight values to attain a summed weight value, and replacing the weight value of the corpus PAP parameter with the summed weight value.

DETAILED DESCRIPTION

Figure 1:
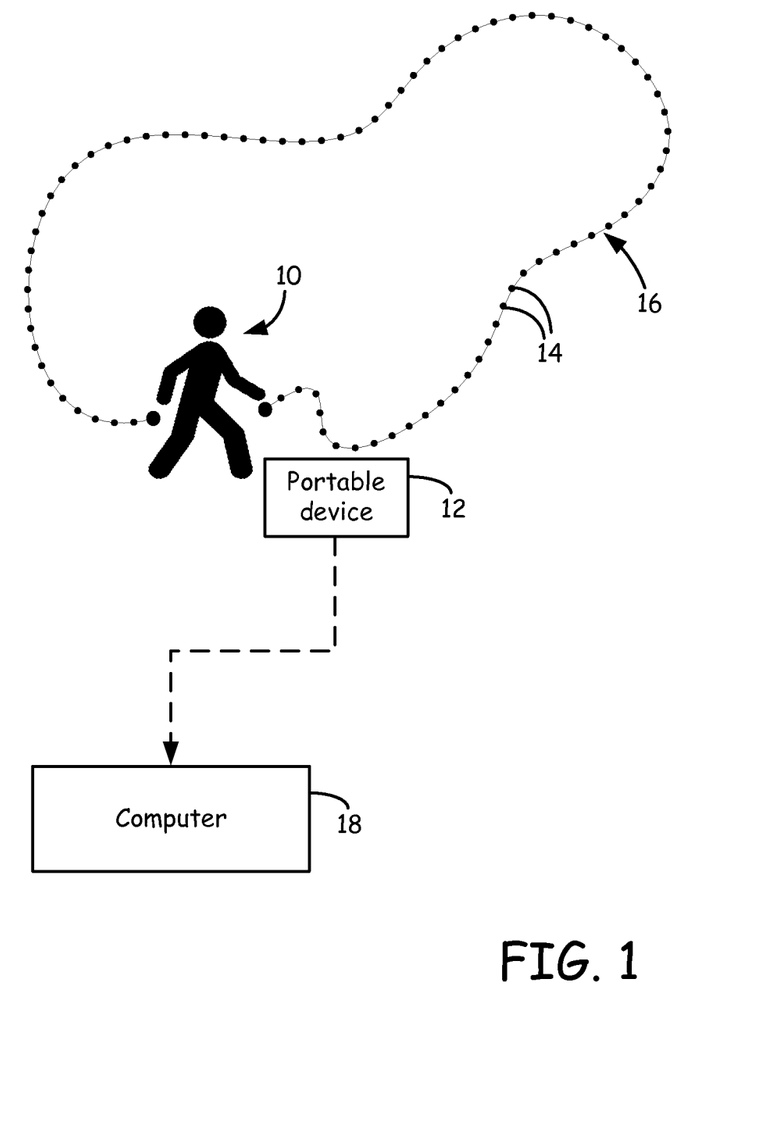
FIG. 1 is an illustration of a method for generating new route data and updating corpus route data with the new route data.

The present disclosure is directed to a method for increasing waypoint accuracies for positional routes (e.g., roads, trails, paths, tracks, etc. . . . ) used to generate crowd-sourced maps. As shown in FIG. 1, the method involves having person 10 use portable device 12 to record waypoints 14 as person 10 moves along route 16. Route 16 may be any desired road, trail, path, track, or the like that person 10 desires to record. As discussed below, portable device 12 may also record positional-accuracy measurements and environment information for waypoints 14, which may be used to calculate precision accuracy prediction (PAP) parameters for waypoints 14.

The recorded waypoint 14 and the associated PAP parameters may be transferred to computer 18, where the transferred data is compared to corpus route data used to generate crowd-sourced maps. In particular, as discussed below, waypoints 14 and the associated PAP parameters for waypoints 14 are compared to existing corpus waypoints and associated corpus PAP parameters to determine their relative accuracies. Based on the determined accuracies, the corpus waypoints may be updated with waypoints 14 to increase the waypoint accuracy for route 16 in the generated crowd-sourced maps.

Figure 2:
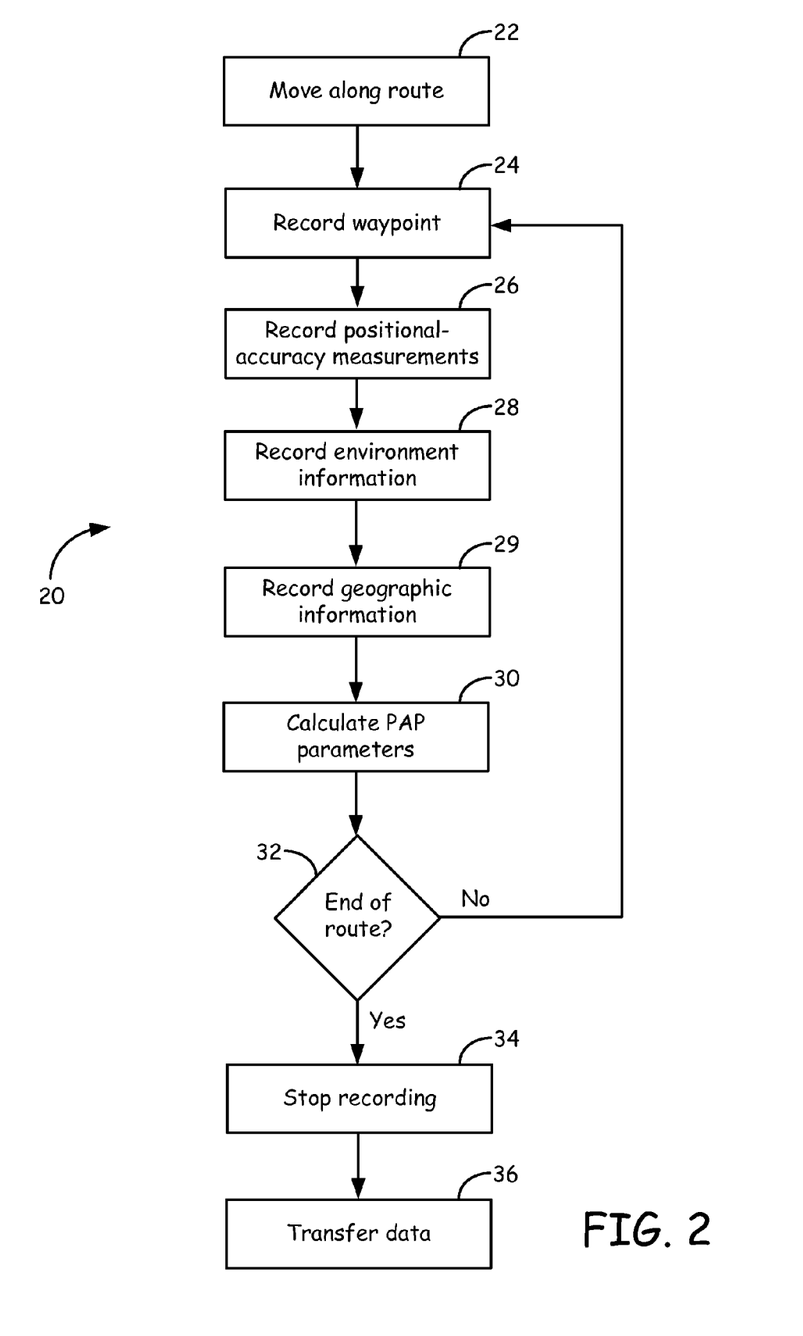
FIG. 2 is a flow diagram of a method for generating the new route data.

FIG. 2 illustrates method 20 for using portable device 12 while person 10 moves along route 16. As shown, method 20 includes steps 22-36, and initially involves moving along route 16 (step 22), and recording a waypoint 14 along route 16 (step 24). Waypoint 14 may be a GPS coordinate waypoint that includes time-stamped coordinates, such as a latitude coordinate, a longitude coordinate, and optionally, an altitude level. For each waypoint 14, portable device 12 also records positional-accuracy measurements related to the GPS signals, such as GPS dilution of precision (DOP) effects (e.g., horizontal DOP effects), GPS error distances, satellite signal to noise ratios, the number of satellites utilized, satellite configurations, combinations thereof, and the like (step 26).

Additionally, portable device 12 may also record ephemeral environment information (e.g., humidity, precipitation, temperature, barometric pressure, combinations thereof, and the like) (step 28), which is desirably time stamped with waypoint 14. As discussed below, the environment information may be received by an environment sensor that communicates with and/or is integral with portable device 12. Alternatively, portable device 12 may identify the location of waypoints 14 and download the environment information from one or more external sources (e.g., via the Internet).

In some embodiments, portable device 12 may also collect geographic information that may affect the accuracies of waypoints 14 (step 29). For example, portable device 12 may identify the location of waypoints 14 and download geographic information from one or more external sources (e.g., via the Internet), such as elevations of surrounding terrain or other factors that might block or reflect GPS signals, or degrade the accuracies of waypoints 14.

Portable device 12 may then analyze the positional-accuracy measurements, the environment information, and any geographic information to calculate a PAP parameter associated with waypoint 14 (step 30). The PAP parameter associated with waypoint 14 represents the accuracy of waypoint 14, and has a measure of expected precision or error from the true position that waypoint 14 represents.

The PAP parameter may be calculated by initially generating a "quality tuple" or other suitable "quality parameter set" for the given waypoint 14 based on the positional-accuracy measurements. The quality tuple may include a weight value, a confidence value, and an error distance. The weight value is a representation of the amount of data that went into producing the associated waypoint 14. The error distance is an estimated distance (e.g., in meters) between the associated waypoint 14 and the true position that it represents. The confidence value represents the likelihood that the true position is within the error distance.

For recording waypoints 14 with no initial information other than the coordinates (i.e., little or no positional-accuracy measurements), portable device 12 may assign a default weight of "1", a confidence value of "0.5", and an error distance of 10 meters for each waypoint 14, which can be referred to by [W1, C0.5, E10]. The "C0.5" and "E10" correspond to a probability distribution circle of accuracy having a 50% probability that the true position is within 10 meters of the associated waypoint 14.

Additionally, the positional-accuracy measurements may be used to modify the default values of the quality tuple. For example, a sequence of low error distances (e.g., less than four meters) lasting for more than about five seconds may imply a slowly improving quality. This may allow the error distance of the quality tuple to be decreased by a selected amount (e.g., by about 5% to about 25%). Furthermore, if the number of satellites obtained is low and/or if the signal-to-noise ratio drops below an expected value based on the elevation of the satellites, then the error distance of the quality tuple may be increased by a selected amount (e.g., by about 20% to about 50%). As can be appreciated, high confidence values and low error distances correspond to higher accuracies.

The quality tuple may then be adjusted with the environment information and/or the geographic information. For example, if the time and location of the given waypoint 14 had precipitation and/or high humidity, then the confidence value may be lowered by a selected amount. Additionally, if the geography where the given waypoint 14 is located has terrain or other factors that might block or reflect GPS signals (e.g., tall buildings), then the confidence value may be further lowered by a selected amount. The resulting adjusted quality tuple is then referred to as the PAP parameter for the given waypoint 14.

If person 10 continues to move along route 16 (step 32), portable device 12 may then continue to performs steps 24-32 to record successive waypoints 14 and calculate associated PAP parameters until person 10 ends the route 16 and stops portable device 12 from further recording (step 34). Person 10 may then transfer waypoints 14 and the associated PAP parameters from portable device 12 to computer 18, directly (e.g., directly to a server) or indirectly (e.g., via an intermediary computer) (step 36).

In an alternative embodiment, the PAP parameters may be calculated by computer 18. In this embodiment, under step 36 of method 20, person 10 may transfer waypoints 14, the positional-accuracy measurements, any recorded environment information, and/or any recorded geographic information from portable device 12 to computer 18.

Figure 3:
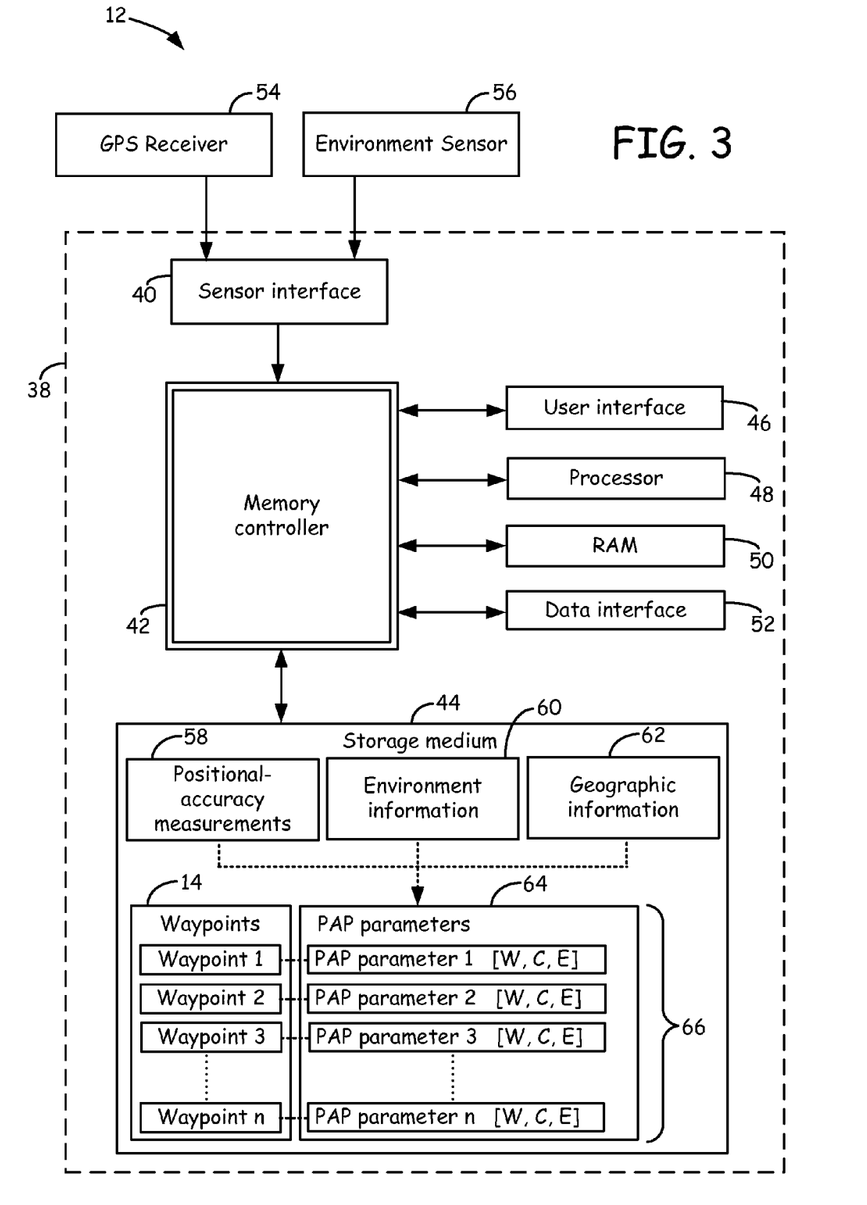
FIG. 3 is a block diagram of a portable electronic device for generating the new route data.

FIG. 3 illustrates an example embodiment of portable device 12 for performing method 20. Portable device 12 is a portable electronic device that may be wearable or otherwise retained by person 10 while person 10 moves along a route, such as route 16. For example, portable device 12 may be a specialized device that is dedicated for performing the steps of method 20. Alternatively, portable device 12 may be a commercially-available product, such as a currently available sports watch, cycling computer, mobile media device, and the like, which is configured with firmware/software to perform the steps of method 20.

In the shown embodiment, portable device 12 includes device housing 38, sensor interface 40, memory controller 42, storage medium 44, user interface 46, processor 48, RAM 50, and data interface 52. Device housing 38 may be any suitable housing, which preferably allows portable device 12 to be worn or otherwise retained by person 10, such as a wearable watch housing and strap, a cycling computer housing, a mobile media device, and the like. Portable device 12 may also include a variety of additional components that are typically contained in portable computer-based devices (e.g., batteries, firmware, and the like).

Sensor interface 40 is a device interface for communicating with one or more sensors, such as GPS receiver 54, environment sensor 56, and any other suitable sensor (e.g., sports-related sensors). In one embodiment, sensor interface 40 may be a wireless receiver to communicate with GPS receiver 54 and environment sensor 56 over a wireless connection, such as under a radio-frequency (RF) protocol, a Wi-Fi wireless protocol, or an ANT+ wireless protocol.

GPS receiver 54 is an example of a suitable position sensor for use with portable device 12, and is configured receive GPS signals for providing waypoints 14. Environment sensor 56 is one or more sensors or receivers configured to measure ephemeral environment information that may affect the accuracies of the recorded waypoints 14 while person 10 moves along route 16, such as humidity, precipitation, temperature, barometric pressure, combinations thereof, and the like. In some embodiments, one or both of GPS receiver 54 and environment sensor 56 may be internal components to portable device 12.

Memory controller 42 includes a circuit assembly that interfaces the components of portable device 12 with RAM 50 and provides bus clock cycles for time-stamped data recording. Storage medium 44 includes one or more computer readable media, such as solid-state media and/or hard disc drives, which may be removable or non-removable devices. User interface 46 includes a user display and input interface, allowing person 10 to operate portable device 12. Processor 48 is one or more processing units, and RAM 50 is one or more volatile random access memory modules. In alternative embodiments, memory controller 42 may be omitted, and processor 48 may control data transfers (e.g., to storage medium 44 and RAM 50).

Data interface 52 is an interface configured to communicate with and/or receive electrical power from computer-based systems (e.g., computer 18), such as a universal serial bus (USB) interface. Alternatively, portable device 12 may communicate with server 18 (e.g., a server or intermediary computer) or other computer-based systems wirelessly, such as with sensor interface 40.

While performing method 20, GPS receiver 54 receives GPS signals and transmits the signals to portable device 12 via sensor interface 40. Processor 48 may then record these signals on storage medium 44 (and/or RAM 50) as waypoints 14 and positional-accuracy measurements 58. Environment sensor 56 and/or data interface 52 may also transmit environment information signals to sensor interface 40, and processor 48 may then record these signals on storage medium 44 (and/or RAM 50) as environment information 60. Furthermore, in some embodiments, portable device 12 may receive geographic information signals via sensor interface 40 and/or data interface 52, and processor 48 may then record these signals on storage medium 44 (and/or RAM 50) as geographic information 62.

Processor 48 may then calculate PAP parameters 64 for each waypoint 14 from positional-accuracy measurements 58, environment information 60, and/or geographic information 62, and record PAP parameters 64 on storage medium 44 (and/or RAM 50). After completing route 16, person 10 may then transfer waypoints 14 and PAP parameters 64 (collectively referred to as new route data 66) to computer 18.

Figure 4:
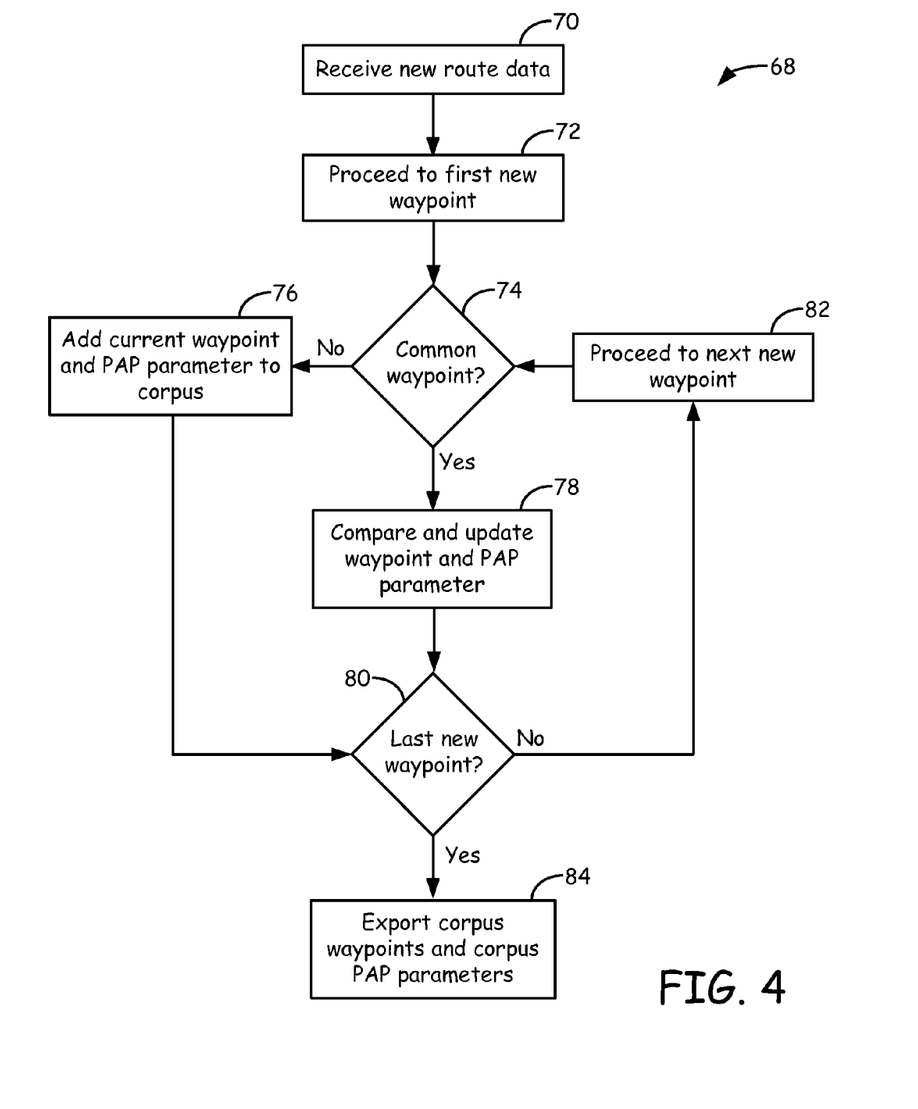
FIG. 4 is a flow diagram of a method for updating the corpus route data with the new route data.

FIG. 4 illustrates method 68 for using computer 18 to update corpus route data with new route data 66. As shown, method 68 includes steps 70-84, and initially involves receiving new route data 66 from portable device 12, directly or indirectly (step 70). As discussed above, in some embodiments, computer 18 may calculate PAP parameters 64 rather than portable device 12. In these embodiments, new route data 66 includes waypoints 14, positional-accuracy measurements 58, environment information 60, and/or geographic information 62.

Pursuant to step 72, computer 18 then proceeds to the first waypoint 14 of new route data 66, and determines whether the corpus route data retained on or is otherwise accessible by computer 18 has any corpus waypoints in common with the first waypoint 14 (step 74). For example, waypoint 14 may be in common with a corpus waypoint if the two waypoints are within a small area of each other (e.g., within 10 meters).

If waypoint 14 is not in common with any corpus waypoint, then computer 18 may add waypoint 14 and its associated PAP parameter 64 to the corpus route data (step 76). Alternatively, if waypoint 14 is in common with a corpus waypoint, then computer 18 compares waypoint 14 its associated PAP parameter 64 to the common corpus waypoint and its associated corpus PAP parameter, and updates the corpus waypoint and the corpus PAP parameter based on the comparison (step 78), as discussed below.

If the current waypoint 14 is not the last waypoint 14 of new route data 66 (step 80), then computer 18 may proceed to the next waypoint 14 (step 82) and repeat steps 74-82 until each waypoint 14 and associated PAP parameter 64 of new route data 66 is compared to the corpus route data. As discussed below, if any of waypoints 14 are more accurate than the corpus waypoints (as indicated by PAP parameters 64 and the corpus PAP parameters), then the corpus route data may be updated with those more-accurate waypoints 14, such as with a weighted average. Computer 18 may then export the resulting corpus waypoints and corpus PAP parameters as the updated corpus route data for use in generating crowd-sourced maps.

The increased accuracies potentially attained with waypoints 14 correspondingly increases the waypoint accuracies of the routes for the crowd-sourced maps. As can be appreciated, methods 20 and 68 allow crowd-sourced maps to be updated by virtually anyone in an automated manner that rejects or reduces the effects of waypoints having lower accuracies.

Figure 5:
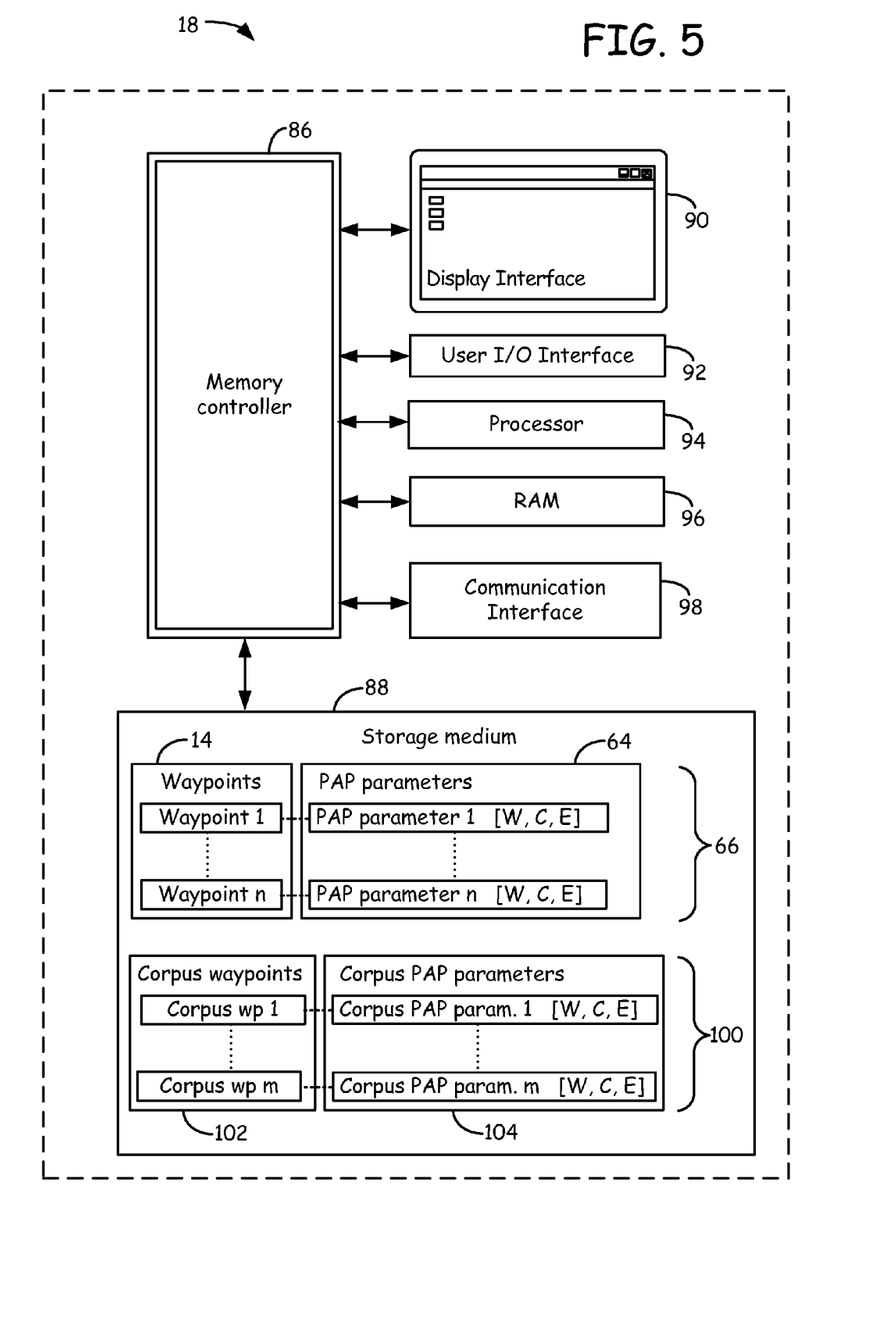
FIG. 5 is a block diagram of a computer-based system for updating the corpus route data with the new route data.

FIG. 5 illustrates an example embodiment of computer 18 for performing method 68. Computer 18 may be one or more computer-based systems, such as one or more personal computers, laptop computers, server-based systems, mobile devices, computer tablet devices, and the like.

As shown, computer 18 includes memory controller 86, storage medium 88, display interface 90, user input interface 92, processor 94, RAM module 96, and communication interface 98. Computer 18 may also include a variety of additional components that are typically contained in computer-based systems (e.g., BIOS firmware). Memory controller 86 is a circuit assembly that interfaces the components of computer 18 with RAM 96 and provides bus clock cycles data manipulation. Storage medium 88 is one or more computer readable media, such as solid-state media and/or hard disc drives, which may be removable or non-removable devices.

Display interface 90 and user input/output (I/O) interface 92 include user controls (e.g., display monitor, keyboard, and computer mouse), allowing person 10 (or any other suitable person) to operate computer 18. In some embodiments, display interface 90 and user I/O interface 92 may be combined in a single interface, such as a touch-screen display. In other embodiments, display interface 90 and user I/O interface 92 may be omitted. Processor 94 is one or more processing units, and RAM 96 is one or more volatile random access memory modules. Communication interface 98 is an interface configured to communicate with portable device 12, and may also be configured to communicate with other computer-based systems over networks (e.g., over the Internet).

As further shown, storage medium 88 includes corpus route data 100, which is a database for generating crowd-sourced maps, and includes corpus waypoints 102 and associated PAP parameters 104. While performing method 68, computer 18 may receive new route data 66 (including waypoints 14 and associated PAP parameters 64) directly or indirectly from portable device 12 over communication interface 98. Processor 94 may then record new route data 66 on storage medium 88 (and/or RAM 96).

When comparing a waypoint 14 to corpus waypoints 102 to determine whether the given waypoint 14 is common with any corpus waypoint 102 (pursuant to step 74 of method 68), processor 94 may compare the coordinate values of waypoint 14 to the coordinate values of corpus waypoints 102, which are desirably arranged in a list or hierarchy structure to reduce the time require search and compare the coordinate values.

Figure 6A:
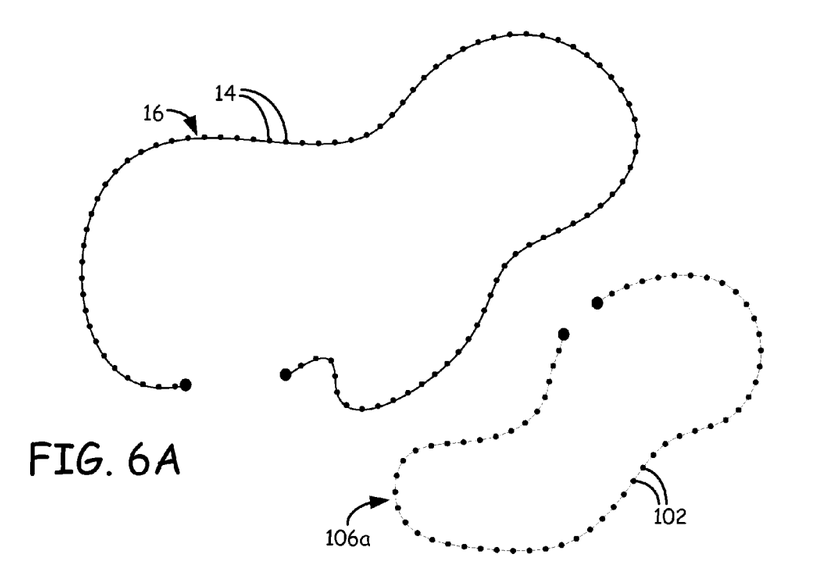
FIGS. 6A-6F are illustrations of comparisons between waypoints of the new route data and the corpus route data.

FIGS. 6A-6F illustrate various scenarios in which waypoints 14 are compared to corpus waypoints 102 to identify common waypoints, where waypoints 14 are based on route 16 and corpus waypoints 102 are based on alternative routes 106a-106f. FIG. 6A shows a situation where routes 16 and 106a do not overlap, such that none of waypoints 14 are in common with any corpus waypoints 102. In this situation, all of waypoints 14 may be added to corpus route data 100, where waypoints 14 become corpus waypoints 102, and the associated PAP parameters 64 become corpus PAP parameters 104.

In one embodiment, computer 18 may require minimum acceptable values for the confidence and error distances of PAP parameters 64 (e.g., confidence of at least 50% and error distances of 10 meters or less). This prevents waypoints 14 that are highly unreliable from being accepted in corpus route data 100.

Figure 6B:
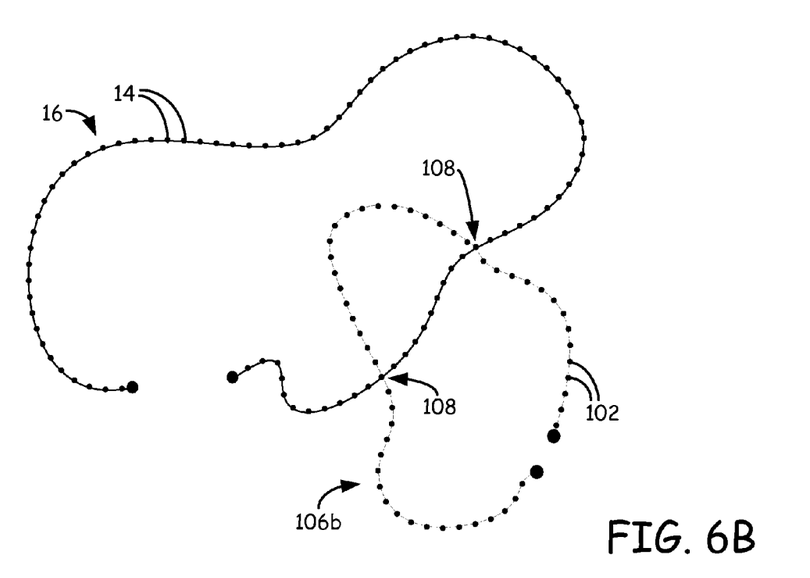
Figure 6C:
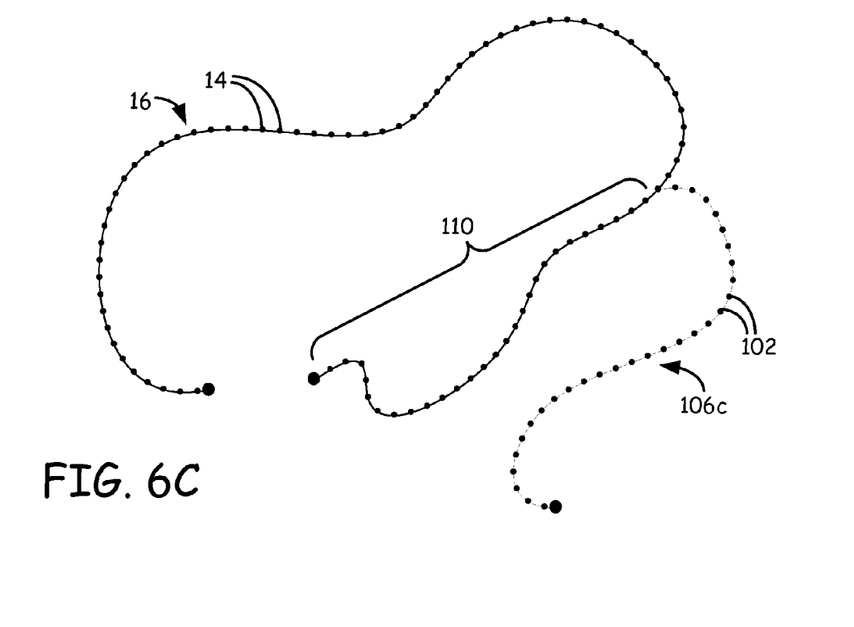
Figure 6D:
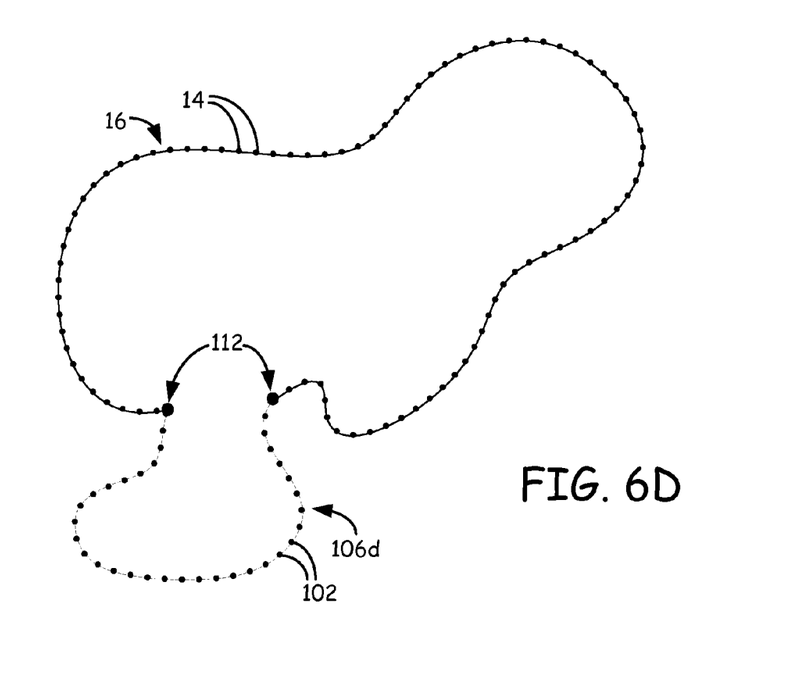
Figure 6E:
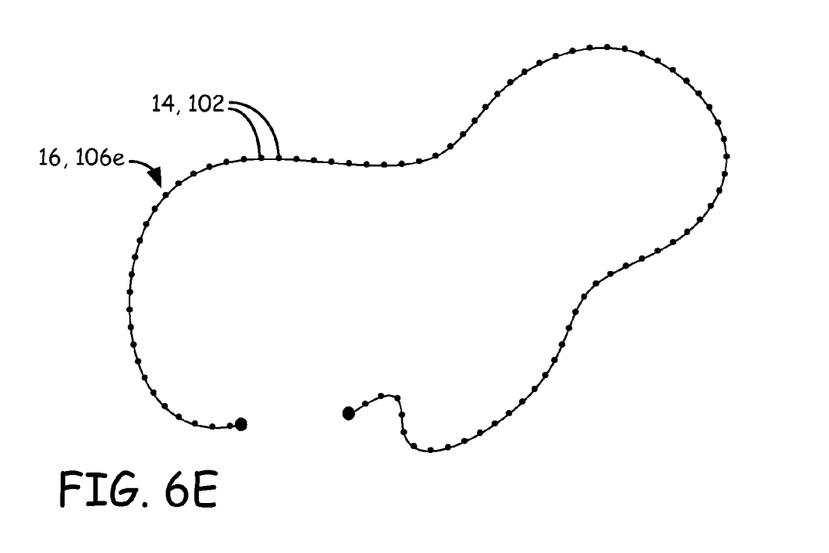
Figure 6F:
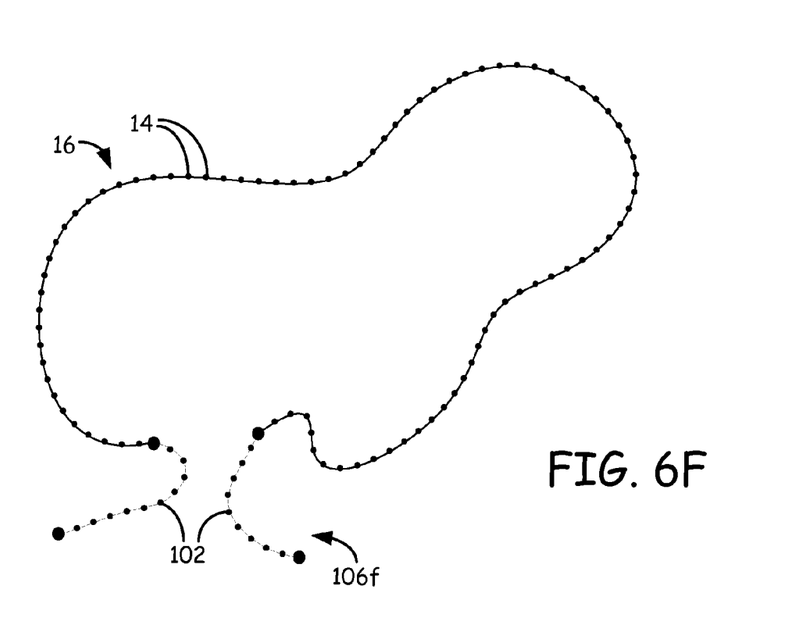

FIG. 6B-6F show situations where route 16 overlaps with the routes of corpus waypoints 102. In FIG. 6B, route 16 overlaps route 106b at two common waypoint locations 108. In FIG. 6C, route 16 overlaps route 106c along common segment 110 of the routes. In FIG. 6D, route 16 overlaps route 106d at two common start/end waypoint locations 112. In FIG. 6E, routes 16 and 106e overlap along their entire lengths. In FIG. 6F, route 106f overlaps the entire length of route 16, and extends beyond route 16.

In the situations shown in FIGS. 6B-6F, at each overlapped or common waypoint location, computer 18 compares the waypoint 14 and its associated PAP parameter 64 to the respective corpus waypoint 102 and its associated PAP parameter 104, pursuant to step 78 of method 68. As discussed below, based on this comparison, computer 18 may update the given corpus waypoint 102 and its associated PAP parameter 104 with waypoint 14 its associated PAP parameter 64 to increase the waypoint accuracy.

Figure 7:
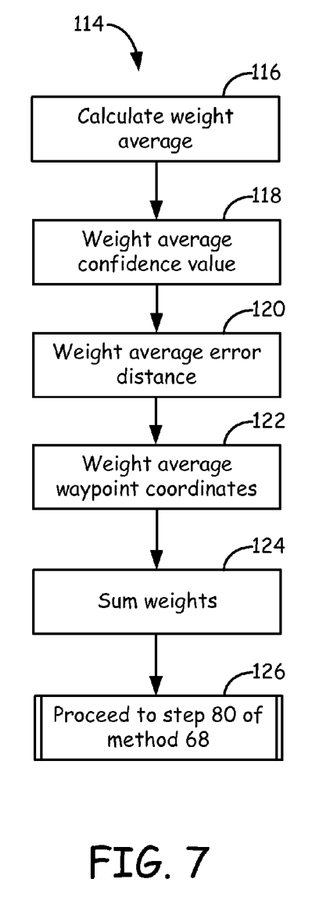
FIG. 7 is a flow diagram of a first embodied method for comparing and updating waypoints and associated quality parameters for the corpus route data.
Figure 8:
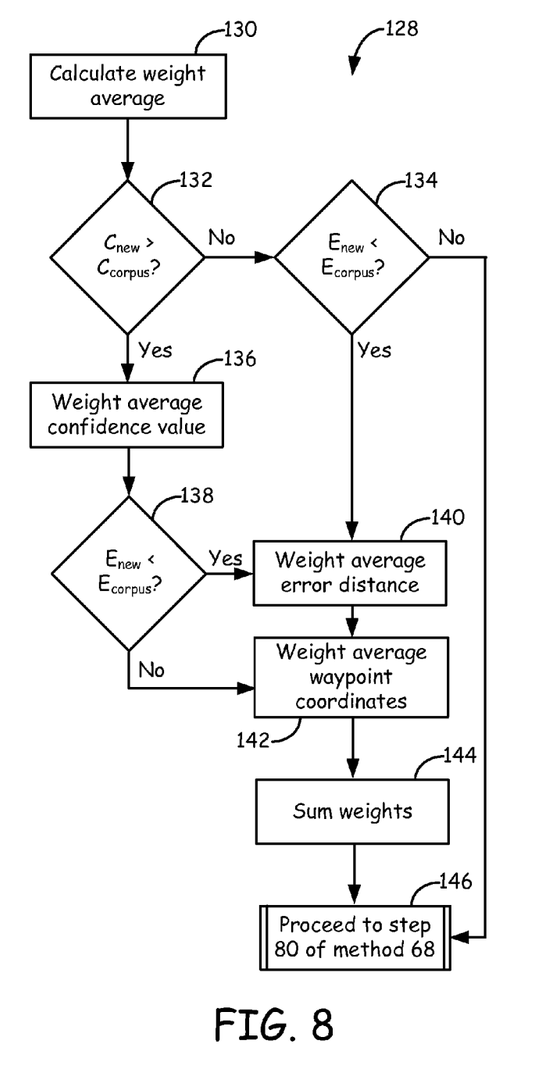
FIG. 8 is a flow diagram of a second embodied method for comparing and updating waypoints and associated quality parameters for the corpus route data.
Figure 9:
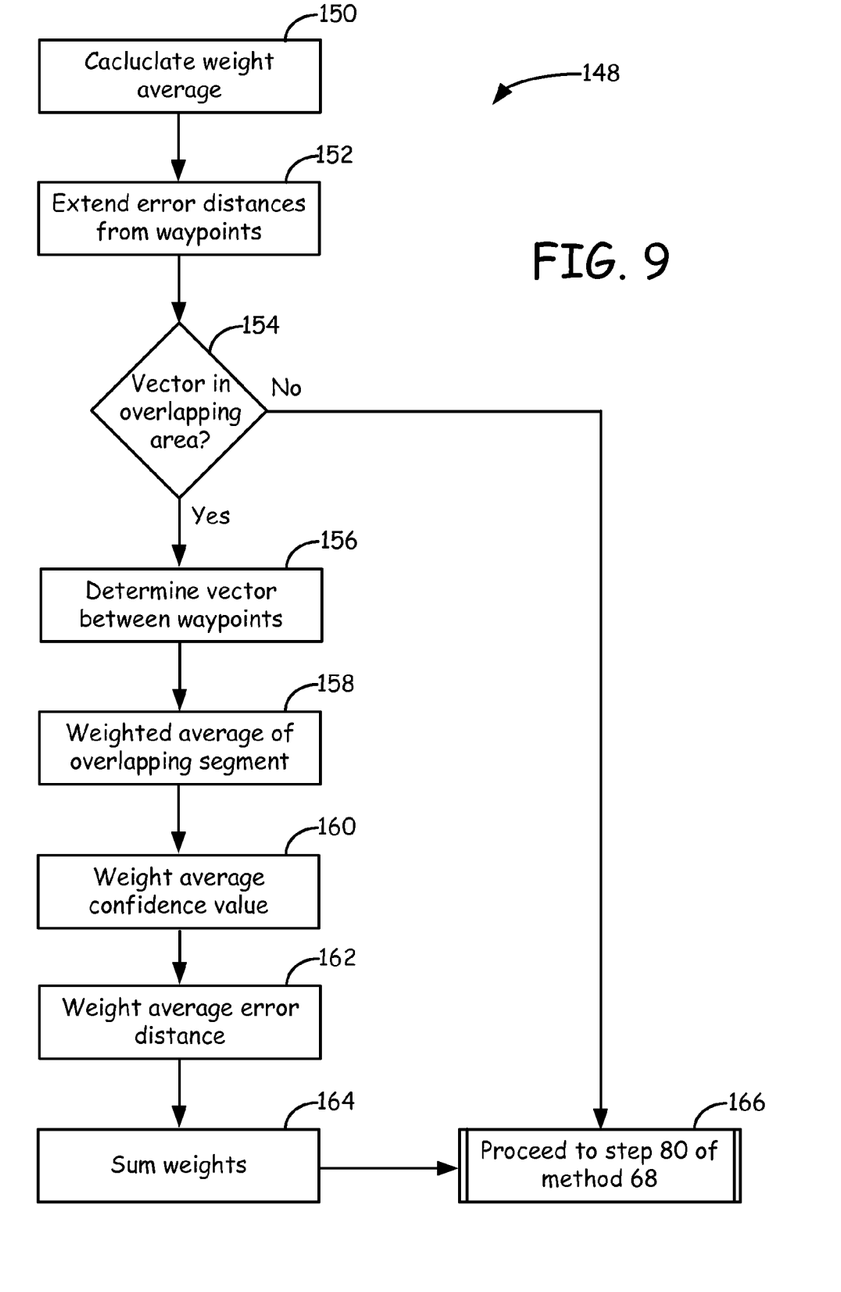
FIG. 9 is a flow diagram of a third embodied method for comparing and updating waypoints and associated quality parameters for the corpus route data.

FIGS. 7-9 depict alternative embodiments for comparing and updating the waypoints and PAP parameters, pursuant to step 78 of method 68. FIG. 7 shows method 114, which is based on weighted average calculations, and includes steps 116-126. Pursuant to step 116, for a given common pair of waypoint 14 and corpus waypoint 102, computer 18 calculates the weight average value from the weights of PAP parameter 64 and corpus PAP parameter 104 (step 116). For example, if the weight from the quality tuple of PAP parameter 64 is "1" and the weight from the quality tuple of corpus PAP parameter 104 is "9", then the weight average is 10% of waypoint 14 and its associated PAP parameter 64, and 90% of corpus waypoint 102 and its associated corpus PAP parameter 104.

Computer 18 may then use the calculated weight average to then calculate the weight average confidence value from the confidence values of PAP parameter 64 and corpus PAP parameter 104 (step 118). For example if the confidence value from the quality tuple of PAP parameter 64 is "0.5" and the confidence value from the quality tuple (or other quality parameter set) of corpus PAP parameter 104 is "1.0", then the weight average confidence value is 10%×(0.5)+90% (1.0), or 0.95.

Computer 18 may also use the calculated weight average to calculate the weight average error distance from the error distances of PAP parameter 64 and corpus PAP parameter 104 (step 120). For example if the error distance from the quality tuple of PAP parameter 64 is "8 meters" and the error distance from the quality tuple of corpus PAP parameter 104 is "6 meters", then the weight average confidence value is 10%× (8)+90% (6), or 6.2 meters.

Furthermore, computer 18 may also use the calculated weight average to calculate the weight average coordinates for waypoint 14 and corpus waypoint 102 (step 122). As such, computer 18 may apply the calculated weighted average to each of the latitude coordinates, the longitude coordinates, and optionally, the altitude levels to attain the weight average coordinates.

As can be appreciated, the relative weights of PAP parameter 64 and corpus PAP parameter 104 can have a substantial impact on the resulting values. This typically prevents new waypoint 14 its associated PAP parameter 64 from significantly changing established corpus waypoints 102 and corpus PAP parameters 104, providing a gradual increase in waypoint accuracy. To that end, computer may also add the weights of PAP parameter 64 and corpus PAP parameter 104 (step 124) to provide a summed weight, which is then used to replace the previous weight of corpus PAP parameter 104.

This summed weight may further preserve the resulting corpus waypoints 102 and corpus PAP parameters 104. As such, when computer 18 proceeds to step 80 of method 68 (step 126), the resulting corpus waypoint 102 has coordinates based on the weighted average calculations discussed above for step 122, and the resulting corpus PAP parameter 104 may have, for example, a quality tuple of [W10, C0.95, E6.2].

FIG. 8 shows method 128, which is an alternative to method 114 (shown in FIG. 7) and is based on weighted average calculations as well as comparisons of the relative confidence values and error distances. Method 128 includes steps 130-146, and initially involves, for a given common pair of waypoint 14 and corpus waypoint 102, calculating the weight average value from the weights of PAP parameter 64 and corpus PAP parameter 104, as discussed above for step 116 of method 114 (step 130).

Computer 18 also compares the confidence value from the quality tuple of PAP parameter 64 (referred to as "$C_{new}$") to the confidence value from the quality tuple of corpus PAP parameter 104 (referred to as "$C_{corpus}$") (step 132). Following the above-discussed example, this results in a comparison of $C_{new}$=0.5 and $C_{corpus}$=1.0, such that $C_{new}$ is not greater than $C_{corpus}$.

As such, computer then compares the error distance from the quality tuple of PAP parameter 64 (referred to as "$E_{new}$") to the error distance from the quality tuple of corpus PAP parameter 104 (referred to as "$E_{corpus}$") (step 134). Again, following the above-discussed example, this results in a comparison of $E_{new}$=8 and $E_{corpus}$=6, such that $E_{new}$ is not less than $E_{corpus}$. In this situation, waypoint 14 and PAP parameter 64 are ignored and not used for updating corpus waypoints 102 and corpus PAP parameters 104. This result is obtained because waypoint 14 has a lower accuracy than corpus waypoint 102, thereby preventing waypoint 14 from being used.

In an alternative example, if, during step 132, $C_{new}$ is greater than $C_{corpus}$, then computer 18 may use the calculated weight average to then calculate the weight average confidence value from the confidence values of PAP parameter 64 and corpus PAP parameter 104, as discussed above for step 118 of method 114 (step 136). Computer 18 may then proceed to step 138 to $E_{new}$ to $E_{corpus}$. In an example in which $E_{new}$ is less than $E_{corpus}$ (either under step 134 or step 136), computer 18 may then use the calculated weight average to then calculate the weight average error distance from the error distances of PAP parameter 64 and corpus PAP parameter 104, as discussed above for step 120 of method 114 (step 140).

Computer 18 may also use the calculated weight average to calculate the weight average waypoint coordinates for waypoint 14 and corpus waypoint 102, as discussed above for step 122 of method 114 (step 142), add the weights of PAP parameter 64 and corpus PAP parameter 104, as discussed above for step 124 of method 114 (step 144), and proceed to step 80 of method 68 (step 146). Method 128 differs from method 114 in that, under method 128, the confidence values and error distances are updated only if the new values from PAP parameter 64 provide higher accuracies than the respective values of corpus PAP parameters 104. Moreover, the waypoint coordinates are only updated and the weights are only added up if the confidence values and/or the error distances are updated.

FIG. 9 shows method 148, which is an alternative to method 114 (shown in FIG. 7) and method 128 (shown in FIG. 8), and is based on weighted average calculations as well as probability distribution circles, as shown below in FIGS. 10A-10C. As shown in FIG. 9, method 148 includes steps 150-166, and initially involves, for a given common pair of waypoint 14 and corpus waypoint 102, calculating the weight average value from the weights of PAP parameter 64 and corpus PAP parameter 104, as discussed above for step 116 of method 114 (step 150).

Computer 18 may also extend the respective error distances as radii from waypoint 14 and corpus waypoint 102 (step 152). This generates probability distribution circles around waypoint 14 and corpus waypoint 102 based on their respective error distances from PAP parameter 64 and corpus PAP parameters 104. Computer 18 then determines whether any areas of the two probability circles overlap (step 154). If not, waypoint 14 and PAP parameter 64 are ignored and not used for updating corpus waypoints 102 and corpus PAP parameters 104.

Alternatively, if the two probability circles overlap (step 154), computer 18 may then computationally generate a linear vector line between waypoint 14 and corpus waypoint 102 (step 156), identify the segment of the linear vector line that resides in the overlapping area, and may use the calculated weight average to calculate the weighted average of the segment residing in the overlapping area (step 158). Examples of the computations under steps 156 and 158 are shown below in FIGS. 10B and 10C.

Computer 18 may then use the calculated weight average to calculate the weight average confidence value from the confidence values of PAP parameter 64 and corpus PAP parameter 104, as discussed above for step 118 of method 114 (step 160), and to calculate the weight average error distance from the error distances of PAP parameter 64 and corpus PAP parameter 104, as discussed above for step 120 of method 114 (step 162). Computer 18 may then add the weights of PAP parameter 64 and corpus PAP parameter 104, as discussed above for step 124 of method 114 (step 164), and proceed to step 80 of method 68 (step 166).

Figure 10A:
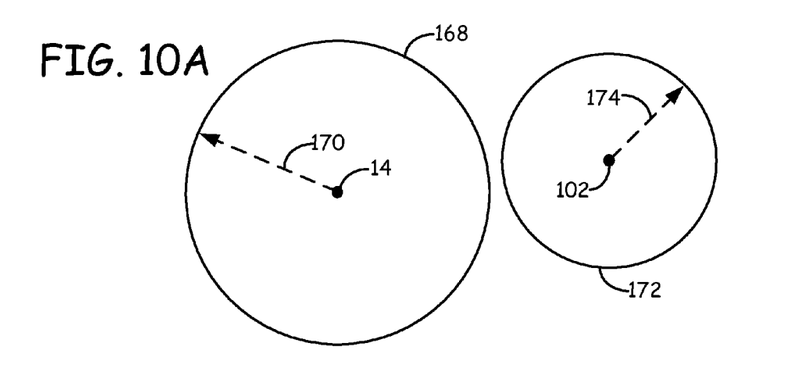
FIGS. 10A-10C are illustrations of example waypoints for performing the third embodied method shown in FIG. 9.
Figure 10B:
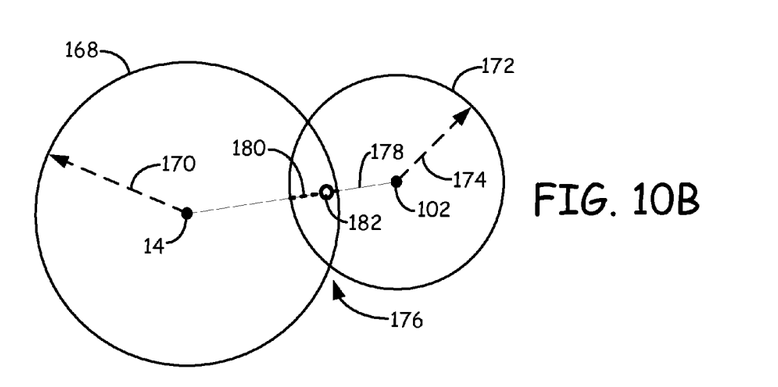
Figure 10C:
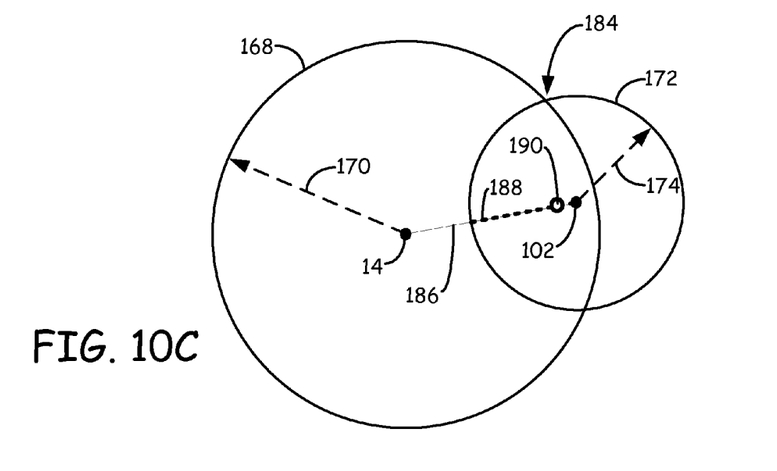

FIGS. 10A-10C illustrate example probability distribution circles generated by computer 18. As shown in FIG. 10A, the error distance from the quality tuple of PAP parameter 64 provides probability circle 168 with radius 170 around waypoint 14, where radius 170 is the length of the error distance from waypoint 14. Similarly, the error distance from the quality tuple of corpus PAP parameter 104 provides probability circle 172 with radius 174 around corpus waypoint 102, where radius 174 is the length of the error distance from corpus waypoint 102. In the example shown in FIG. 10A, probability circles 168 and 172 do not overlap. As such, pursuant to step 154 of method 148, waypoint 14 and PAP parameter 64 are ignored and not used for updating corpus waypoints 102 and corpus PAP parameters 104.

In the example shown in FIG. 10B, probability circles 168 and 172 overlap at area 176. As such, pursuant to step 156, computer 18 may computationally generate linear vector line 178 between waypoint 14 and corpus waypoint 102. Pursuant to step 158, computer 18 may then identify the segment of linear vector line 178 that resides in the overlapping area, referred to as segment 180, and may use the calculated weight average to calculate the weighted average of segment 180. Following the above-discussed example having the weight average being 10% of waypoint 14 its associated PAP parameter 64, and 90% of corpus waypoint 102 and its associated PAP parameter 104, the resulting updated waypoint 182 is located along segment 180 at point that is 90% away from the perimeter of probability circle 172, and 10% away from the perimeter of probability circle 168.

In the example shown in FIG. 10C, probability circles 168 and 172 overlap at area 184, where corpus waypoint 102 is located within probability circle 168. In this situation, computer 18 may computationally generate linear vector line 186 between waypoint 14 and corpus waypoint 102, pursuant to step 156. However, because corpus waypoint 102 is located within probability circle 168, the segment of linear vector line 186 that resides in the overlapping area, referred to as segment 188, only extends between the perimeter of probability circle 172 and corpus waypoint 102. Computer 18 may then use the calculated weight average to calculate the weighted average of segment 180 to provide updated waypoint 190. Following the above-discussed example, the updated waypoint 190 is located along segment 188 at a point that is 90% away from the perimeter of probability circle 172 and 10% away from corpus waypoint 102.

In some embodiments, computer 18 may utilize combinations of methods 114, 128, and 148 to compare and update the corpus waypoints and corpus PAP parameters. For example, computer 18 may initially utilize method 114 for initial comparisons and updates (under step 78 of method 68) up to a predetermined number of comparisons and updates. This will provide established corpus waypoints 102 and corpus PAP parameters 104 before switching to either method 128 or method 148. This may preserve the established corpus waypoints 102 and corpus PAP parameters 104, and prevent new outlier waypoints 14 and PAP parameters 64 from significantly affecting corpus route data 100.

Over time, as more new route data 66 is collected, corpus waypoints 102 will move toward the true positions that corpus waypoints 102 represent. Furthermore, the confidence values of corpus PAP parameters 104 will increase, and the error distances of corpus PAP parameters 104 will decrease. In some embodiments, when corpus PAP parameters 104 obtain a weight that exceeds a predetermined weight threshold, computer 18 may prevent further modifications to the corresponding waypoints 102. This further preserves the established corpus waypoints 102 and corpus PAP parameters 104. The resulting corpus waypoints 102 may then be used to generate maps without requiring manual comparisons of waypoint accuracies. As such, corpus waypoints 102 are particularly suitable for generating crowd-sourced maps.

In further embodiments, computer 18 may store new route data 66 previously transferred by others, and may permit download of these previous data files in conventional formats, such as GPS exchange format (GPX), keyhole markup language format (KML), or zipped KML format (KMZ). These previous files may contain waypoints 16 and can also be sent to a website or remote server where the waypoints may be combined with other positions in a database to create a improved estimate of the true position of the intended route. Although these previous files may not necessarily contain PAP parameters, they can also be used as a supplement to method 68 (shown in FIG. 4) to improve the quality of positions on routes they share with corpus route data 100.

Although the present disclosure has been described with reference to preferred embodiments, workers skilled in the art will recognize that changes may be made in form and detail without departing from the spirit and scope of the disclosure.

The invention claimed is:

1. A method for increasing route accuracies, the method comprising:
   recording a waypoint while moving along a route;
   recording a positional-accuracy measurement for the recorded waypoint;
   calculating a position accuracy prediction (PAP) parameter for the recorded waypoint based on the recorded positional-accuracy measurement wherein the PAP parameter comprises a first weight value, a first confidence value, and an-a first error distance; and
   comparing, with a computer processor, the recorded waypoint and the calculated PAP parameter to a corpus waypoint and an associated corpus PAP parameter stored on a computer-based system, wherein the corpus PAP parameter comprises a second weight value, a second confidence value, and a second error distance, and wherein the comparing step comprises:
   calculating a weight average based on the first and second weight values;
   computationally extending the first error distance from the PAP parameter of the recorded waypoint to provide a first probability distribution circle;
   computationally extending the second error distance from the PAP parameter of the corpus waypoint to provide a second probability distribution circle; and
   computationally generating a vector line between the recorded waypoint and the corpus waypoint; and
   determining, with the computer processor, an updated waypoint along the vector line between the recorded waypoint and the corpus waypoint and within an overlapping area of the first and second probability distribution circles based on the calculated weight average.

2. The method of claim 1, wherein the recorded waypoint comprises GPS waypoint, and wherein recording the GPS waypoint while moving along the route comprises reading GPS signals with a GPS receiver, and storing data of the GPS waypoint on a portable electronic device that communicates with the GPS receiver.

3. The method of claim 1, wherein the recorded positional-accuracy measurement for the recorded waypoint is selected from the group consisting of GPS dilution of precision effects, GPS error distances, satellite signal to noise ratios, a number of satellites utilized, satellite configurations, and combinations thereof.

4. The method of claim 1, and further comprising recording environment information for each recorded waypoint, wherein the recorded environment information is selected from the group consisting of humidity, precipitation, temperature, barometric pressure, and combinations thereof, and wherein the PAP parameter is also based on the recorded environment information.

5. The method of claim 4, and further comprising receiving geographic information, wherein the PAP parameter is further based on the geographic information.

6. The method of claim 4, wherein calculating the PAP parameter comprises:
   generating a quality tuple having the first weight value, the first confidence value, and the first error distance; and
   adjusting at least one of the first confidence value and the first error distance based on the environment information.

7. A method for increasing route accuracies, the method comprising:
   receiving a first GPS waypoint and a first position accuracy prediction (PAP) parameter associated with the first GPS waypoint, wherein the first PAP parameter comprises a first quality parameter set having a first weight value, a first confidence value for the first GPS waypoint, and a first error distance for the first GPS waypoint;
   comparing, with a computer processor, the first PAP parameter to a corpus PAP parameter associated with a corpus GPS waypoint, wherein the corpus PAP parameter comprises a second quality parameter set having a second weight value, a second confidence value for the corpus GPS waypoint, and a second error distance for the corpus GPS waypoint, wherein the comparing step comprises:
   calculating a weight average based on the first and second weight values;
   computationally extending the first error distance from the PAP parameter of the first GPS waypoint to provide a first probability distribution circle;
   computationally extending the second error distance from the PAP parameter of the corpus GPS waypoint to provide a second probability distribution circle; and
   computationally generating a vector line between the first GPS waypoint and the corpus GPS waypoint; and
   determining, with the computer processor, an updated GPS waypoint along the vector line between the first GPS waypoint and the corpus waypoint and within an overlapping area of the first and second probability distribution circles based on the calculated weight average.

8. The method of claim 7, and further comprising replacing the corpus GPS waypoint with the updated GPS waypoint.

9. The method of claim 8, and further comprising:
   calculating an updated confidence value from the first confidence value of the first quality parameter set and the second confidence value of the second quality parameter set based at least in part on the calculated weight average; and
   replacing the second confidence value of the second quality parameter set with the updated confidence value.

10. The method of claim 8, and further comprising:
    calculating an updated error distance from the first error distance of the first quality parameter set and the second error distance of the second quality parameter set based at least in part on the calculated weight average; and replacing the second error distance of the second quality parameter set with the updated error distance.

11. The method of claim 8, and further comprising:
adding the first weight value and the second weight value to attain a summed weight value; and
replacing the second weight value in the second quality parameter set with the summed weight value.

12. The method of claim 7, wherein the first PAP parameter is based on data comprising positional-accuracy measurements for the first GPS waypoint and environment information, the environment information being selected from the group consisting of humidity, precipitation, temperature, barometric pressure, and combinations thereof.

13. The method of claim 7, and further comprising determining, with the computer processor, whether the first GPS waypoint is within a predetermined coordinate area from the corpus GPS waypoint.

14. A method for increasing route accuracies, the method comprising:
receiving a first GPS waypoint and a first position accuracy prediction (PAP) parameter, wherein the first PAP parameter comprises a first quality parameter set having a first weight value, a first confidence value for the first GPS waypoint, and a first error distance for the first GPS waypoint;
reading, with a computer processor, corpus route data from a computer readable medium, the corpus route data comprising a corpus GPS waypoint and an associated corpus PAP parameter, wherein the corpus PAP parameter comprises a second quality parameter set having a second weight value, a second confidence value for the corpus GPS waypoint, and a second error distance for the corpus GPS waypoint;
calculating a weight average based on a ratio of the first weight value of the first quality parameter set and the second weight value of the second quality parameter set;
computationally extending the first error distance from the PAP parameter of the first GPS waypoint to provide a first probability distribution circle;
computationally extending the second error distance from the PAP parameter of the corpus GPS waypoint to provide a second probability distribution circle; and
computationally generating a vector line between the first GPS waypoint and the corpus GPS waypoint;
determining, with the computer processor, an updated GPS waypoint along the vector line between the first GPS waypoint and the corpus waypoint and within an overlapping area of the first and second probability distribution circles based on the calculated weight average;
replacing the corpus GPS waypoint with the updated GPS waypoint;
adding the first weight value and the second weight value to attain a summed weight value; and replacing the second weight value in the second quality parameter set with the summed weight value.

15. The method of claim 14, and further comprising:
comparing the first confidence value of the first quality parameter set to the second confidence value of the second quality parameter set; and
comparing the first error distance of the first quality parameter set to the first error distance of the second quality parameter set.

16. The method of claim 14, and further comprising:
calculating an updated confidence value from the first confidence value of the first quality parameter set and the second confidence value of the second quality parameter set based at least in part on the calculated weight average; and
replacing the second confidence value of the second quality parameter set with the updated confidence value.

17. The method of claim 14, wherein the first PAP parameter is based on data comprising positional-accuracy measurements for the first GPS waypoint and environment information, the environment information being selected from the group consisting of humidity, precipitation, temperature, barometric pressure, and combinations thereof.

* * * * *

UNITED STATES PATENT AND TRADEMARK OFFICE
CERTIFICATE OF CORRECTION

PATENT NO.         : 8,818,717 B2
APPLICATION NO.    : 13/852049
DATED              : August 26, 2014
INVENTOR(S)        : Augusto C. Cardoso, Jr. et al.

It is certified that error appears in the above-identified patent and that said Letters Patent is hereby corrected as shown below:

In the claims

In claim 1, column 11, line 36, before "a first error" delete "an-".

In claim 1, column 11, line 36, after "error distance;" delete "and".

In claim 2, column 11, line 60, delete "comprises GPS waypoint" and insert --comprises a GPS waypoint--.

Signed and Sealed this
Fifteenth Day of March, 2016

Michelle K. Lee
*Director of the United States Patent and Trademark Office*